June 23, 1964 M. A. LEEDOM 3,138,793
ELECTRIC CIRCUIT CONTROL UNIT
Filed March 29, 1961
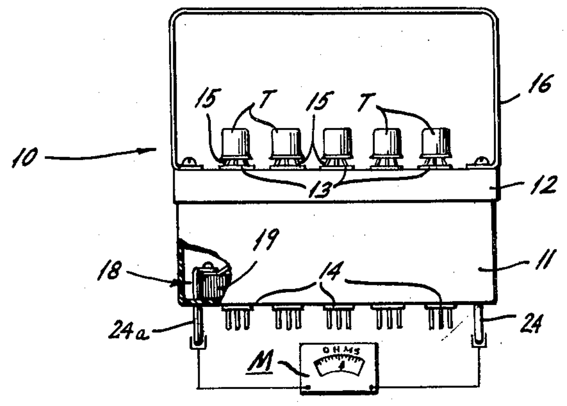
FIG. 1.
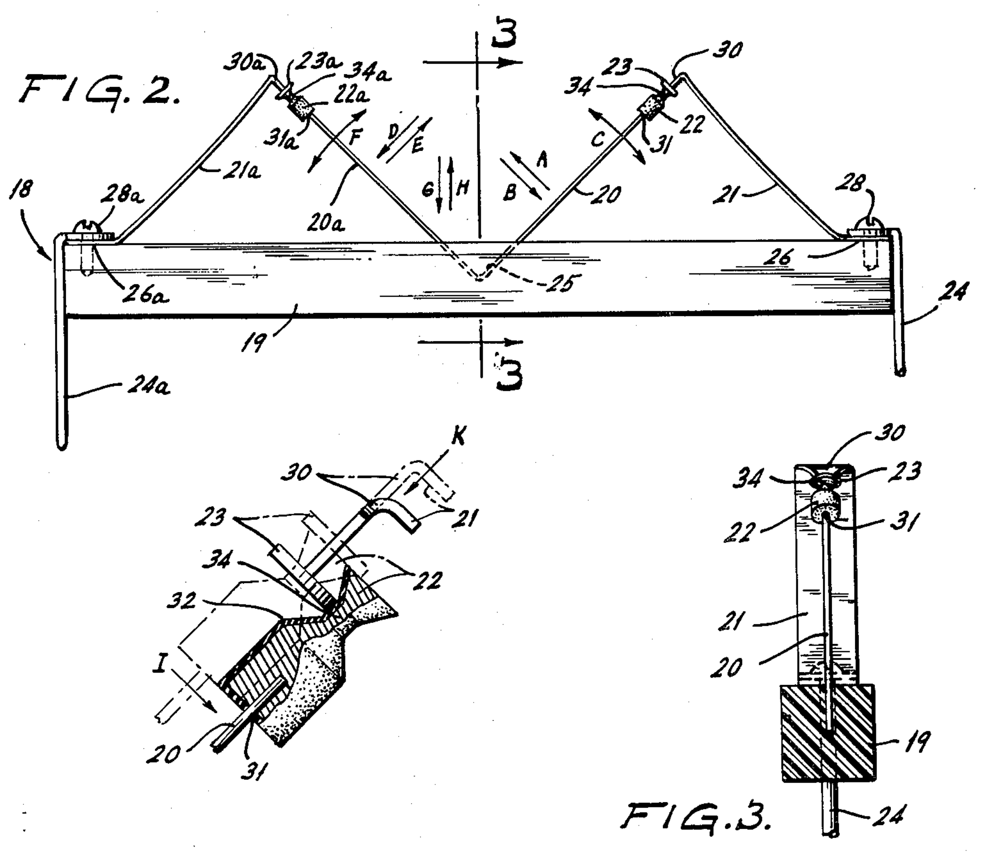
FIG. 2. FIG. 3.
FIG. 4.
INVENTOR.
MARVIN A. LEEDOM
BY
Albert H. Chaaland [signature]
ATTORNEY

United States Patent Office 3,138,793

Patented June 23, 1964

3,138,793

ELECTRIC CIRCUIT CONTROL UNIT

Marvin A. Leedom, Abington, Pa., assignor, by mesne assignments, to Philco Corporation, Philadelphia, Pa., a corporation of Delaware Filed Mar. 29, 1961, Ser. No. 99,155
3 Claims. (Cl. 340—261)

This invention relates to warning systems, and more particularly to a new and improved arrangement including a novel electric circuit control unit for indicating improper handling of articles or devices which may be deleteriously affected by such handling. Although suitable for use with means for handling various kinds of articles or devices, the arrangement of this invention is particularly useful when incorporated in a carrier or magazine for handling electronic components, especially semiconductive devices such as transistors, and will be described in connection with such an arrangement.

In the manufacture of transistors, particularly those intended for use in equipment requiring extreme precision, durability, and reliability, it is most important that the transistors be subjected to a series of exacting tests to determine whether they possess those electrical and mechanical characteristics which are necessary for adequate performance under various operating conditions. In order to facilitate such testing, it is desirable that several transistors be handled at one time and, for that purpose, it is advantageous to arrange a plurality of transistors in a magazine which can then be used to carry out different testing procedures. If, subsequent to or during the testing procedures, the magazine should accidently be dropped or otherwise mishandled, the resulting impacts could seriously affect the structural and operating characteristics of the transistors in a manner which might not be detected until after incorporation of the transistors in elaborate equipment whereby replacement may be impossible, or present serious problems.

It is therefore an object of this invention to insure that devices which have been or are being tested, have not undergone such handling as could result in injury to the devices.

Another object of the invention is to provide a new and novel article-carrying arrangement wherein forces resulting from jarring impacts likely to cause injury to the articles, are utilized to activate means adapted to indicate that the arrangement has been subjected to such forces.

A further object of the invention is to provide means of the character mentioned above which, when combined in a magazine for carrying electrical devices, becomes part of a testing circuit and operates to open the circuit in response to sudden, jarring motions of the magazine, regardless of the direction or angle of impact.

Other features which characterize the invention have to do with the provision of an arrangement of the kind referred to above which is simple in construction and foolproof in operation, and which can be made inexpensively and incorporated with ease in an article carrying assembly.

Toward achieving these objects and features, the invention employs a novel electric circuit control unit including yieldably supported electrical circuit contact elements which are manually set into circuit-making position and which, when subjected to sudden shocks or impacts, automatically move to circuit-breaking position and remain in that latter position until manually reset. In a specific embodiment, certain contact elements are carried by elongated spring means and are thereby urged into frictional contact-making engagement with other contact elements, the latter being carried by vibratile means sensitive to jarring impacts which set it in motion and break the contact-making engagement between companion contact elements.

The full nature and the mode of operation of the invention, as well as the above noted and other objects and characteristic features thereof, will be more fully understood from the following description of a preferred embodiment illustrated in the accompanying drawings, in which:

FIGURE 1 is a side elevation of an article carrier or magazine incorporating the present invention, a wall portion of the outer casing being broken away to illustrate parts of a circuit-control unit housed in said casing;

FIGURE 2 is a side elevation of the circuit control unit shown as separated from the magazine of FIGURE 1;

FIGURE 3 is an enlarged, cross-sectional view taken substantially on line 3—3 of FIGURE 2; and FIGURE 4 is a greatly enlarged fragmentary view, partly in side elevation and partly in section, showing a set of companion contact elements of the unit of FIGURE 2, and illustrating said elements in two different positions, that is, a circuit-breaking position which is shown in full lines, and a circuit-making position which is represented in broken lines.

With more particular reference to the drawings, there is illustrated in FIGURE 1 a carrier or magazine suitable for handling several articles or devices, such as transistors T, to be tested at one time. The magazine comprises an outer casing 11 provided with a cover 12, and with a plurality of sockets 13 and terminal plugs 14. In practice the cover 12 is removable to give access to the casing, the sockets 12 are constructed to receive leads 15 of the transistors, and the terminal plugs 14 are adapted for electrical connection with said leads and are disposed for plug-in connection with the usual circuitry of conventional testing equipment (not shown). A handle 16 is attached to the casing so that the magazine can easily be transported and readily be manipulated to effect its connection to or disconnection from the testing equipment.

In particular accordance with the present invention, means is provided for giving positive warning whenever the magazine is mishandled in a manner which might not be discovered during normal testing procedures, but which could be detrimental to adequate functioning of the transistors when put in use. For that purpose, the magazine 10 as illustrated in FIGURE 1 includes an electric circuit control unit 18. This unit, as seen in FIGURE 2, is composed of an insulating base 19 and a series of conductive members supported by said base, said members including: two pairs of conductive arms 20–21 and **20*a*–21*a*; two sets of companion contact elements 22–23 and 22*a*–23*a*; and a pair of connector prongs 24–24*a***.

The base 19 is in the form of a block of suitable nonconductive material and, as illustrated in FIGURE 1 is adapted for mounting within the casing 11. The conductive arms **20–20*a* as can be seen from FIGURES 2 and 3 are in the form of elongated wire springs provided by a continuous length of spring wire bent at substantially 90°, the bent portion 25 being fixedly embedded in the base 19. The conductive arms 21–21*a* as also best seen in FIGURES 2 and 3, are in the form of elongated flat springs each having one end portion 26–26*a* bent to overlie the base 19. These bent end portions are adapted to receive suitable fastening means, such as screws 28–28*a* for securing the flat spring arms 21–21*a* to said base. As clearly shown in FIGURE 2, the wire spring arms 20–20*a* extend outwardly from the base 19 to diverge from each other in generally right angular directions, and the flat spring arms 21–21*a* extend from said base so that their free ends 30–30*a* converge toward and lie adjacent the free ends 31–31*a* of said wire spring arms 20–20*a***.

In the illustrated embodiment, the contact elements **22–22*a* are carried by said free ends 31–31*a*, respectively, of the wire spring arms 20–20*a*. These contact elements 22–22*a* are in the form of massive bodies or weights so that, because of the flexibility of said wire spring arms, they tend to oscillate with movement of the magazine. However, free oscillation of the massive contact elements 22–22*a* is prevented by function of the contact elements 23–23*a* which are carried by the free end portions 30–30*a*, respectively, of the flat spring members 21–21*a*** and which are maintained thereby in frictional contact engagement with said massive contact elements.

The connector prongs **24–24*a* are carried by the base 19, one prong 24 being electrically connected to the spring arm 21, and the other prong 24*a* being electrically connected to the other spring arm 21*a*. As shown in FIGURE 2, the screws 28–28*a* which secures the spring arms 21–21*a* to the base, also serve to effect electrical connection between said arms and the prongs 24–24*a*** as well as to secure the latter onto said base.

With a magazine as described above, articles such as the transistors T or like devices, can be tested at one time when the terminal plugs 14 and prongs **24–24*a* are inserted into appropriate receptacles provided in external testing equipment in connection with which the magazine 10 of the invention is used. When the magazine is so used, the conductive arms 20–20*a* and 21–21*a*, contacts 22–22*a* and 23–23*a*, and connector prongs 24–24*a*, being connected in series, cooperate with suitable indication means, for example an ohmmeter M as diagrammatically represented in FIGURE 1, to indicate continuity of circuit, thus normally indicating that the carrier or magazine has not been subjected to detrimental shocks or impacts. However, should the carrier or magazine be accidently dropped or otherwise subjected to a sudden shock or impact likely to have deleterious effects on the devices being tested, then such shock or impact would cause either or both of the massive elements 22–22*a*** to move automatically out of contact making position and thus break the circuit continuity.

It is a feature of the present invention that dropping of the carrier or magazine 18 in any direction will result in breaking the circuit continuity. This feature is insured because of the angular relationship between the spring arms 20–21 and **20*a*–21*a*. In this respect, reference is made to FIGURE 2 from which it will be understood that: impacts or shocks resulting from dropping of the carrier or magazine in the general direction of either arrow A or arrow B will set the wire spring arm 20 in motion, as represented by double-headed arrow C, causing the massive contact element 22 to move out of contact with its companion contact element 23; impacts or shocks resulting from dropping of the carrier or magazine in the general direction of either arrow D or arrow E will set the wire spring arm 20*a* in motion, as represented by double-headed arrow F, causing the massive contact element 22*a* to move out of contact with its companion contact element 23*a*; and impacts or shocks resulting from dropping of the carrier or magazine in the general direction of either arrow G or arrow H will set both wire spring arms 20 and 20*a* in motion and cause disengagement of the companion contacts of either or both sets. Also, from FIGURE 2 it will be understood that impacts or shocks resulting from dropping of the carrier or magazine in directions generally transverse to the plane of the drawing will set both wire spring arms 20 and 20*a* in motion in said transverse directions thus causing either or both massive contact elements 22 and 22*a*** to move out of contact-making position.

The manner in which disengagement of the companion contact elements is accomplished, will be more clearly understood from FIGURE 4. In this figure, the aforesaid companion contact elements 22 and 23 are shown in two of their operative positions, that is, a circuit closing position (illustrated in broken lines) and a circuit opening position (illustrated in full lines). From this illustration, it will be understood that impacts or shocks imparted to the magazine while the illustrated contact elements are in circuit closing position, will cause the massive contact element 22 to swing, for instance as indicated by arrow I, so as to cause the contact element 23 to be displaced by action of the associated spring arms 21 in the direction represented by arrow K. Thus as seen in FIGURE 4, the contact element 23 would have automatically moved to circuit opening position wherein the contact element 23 engages the side surface of the contact element 22, which surface is provided with a cover 32 of insulating material. Accordingly continuity of the circuit through the conductive arms would be broken and, since this condition would be indicated by the testing meter, warning would be given to the effect that the magazine has been handled in such a way as is likely to injure the devices carried in said magazine.

The companion contact elements **22–22*a* and 23 and 23*a* if moved to circuit breaking position, will remain in that position until manually set to circuit making position. For that purpose the side of each of contact elements 22–22*a* is provided with a recess 34 so that the corresponding contact elements 23–23*a* seat themselves into and are resiliently retained within said recess in the manner shown in FIGURE 4. To reset the companion contact elements into circuit making position, it is necessary to remove the cover 12 from the casing 11. In this manner there is afforded a reminder to recheck the devices for injury due to the mishandling which occasioned tripping of the circuit breaking arrangement. With such an arrangement the extent of the jarring force or magnitude of the impact required to cause movement of the contact elements to circuit breaking position, can be regulated and predetermined by the mass and size of the swingable contact elements 22–22*a* and wire spring arms 20–20*a***.

Although a preferred embodiment has been shown and described, it will be recognized that the invention is not limited to the specific structures of this embodiment but embraces such changes and variations as come within the scope of the subjoined claims.

What I claim is:

1. An electrical circuit control unit comprising an insulating base and series connected pairs of conductive spring arms mounted thereon, each pair including: a wire spring arm and a substantially flat spring arm which extend outwardly of the base in converging inclined planes and terminate with free end portions disposed adjacent one another; a weight carried by the wire spring arm at its free end portion and adapted to be displaced with oscillatory motion of the wire spring arm in response to mishandling of the unit, the weight having an insulated portion and a conductive portion, the latter constituting a first contact; and a second contact carried by the flat spring arm at its free end portion, the second contact being frictionally maintained in circuit-closing engagement with the first contact by the flat spring arm and adapted to be urged by the latter into position for engagement with the insulated portion of the weight upon displacement thereof.

2. In an arrangement for indicating improper handling of a carrier adapted to receive articles subject to injury by reason of such handling, an electrical circuit control unit incorporated in said carrier, said unit comprising a non-conductive base, pairs of elongated conductive members supported by said base and extending therefrom in angularly related directions, companion contact elements carried by said members, one conductive member of each pair consisting of wire spring arm having a longitudinally extended free end portion and the one contact element carried by said one member of each pair being provided by a massive body extending longitudinally of said portion of the wire spring arm and adapted to oscillate in response to handling of the carrier in the manner aforesaid and thereby to effect movement of said one contact element out of contact-making engagement with respect to its companion contact element, the remaining conductive member of each pair consisting of a substantially flat spring arm having a bent free end portion disposed in longitudinal alignment with the massive body, the contact element carried by the aforesaid remaining member being disposed at said bent free end portion of the flat spring arm and normally pressed thereby into frictional contact-making engagement with said body, the side of the massive body providing the mentioned one contact element being covered with insulating material and having means engageble with the companion contact element for maintaining the same out of contact-making engagement.

3. In an arrangement for indicating improper handling of a unit, electrical indicator circuit means and switching means operable for automatically opening said circuit means in response to improper handling of the unit, said switching means including elongated spring arms mounted to converge in inclined planes and terminating with free end portions disposed adjacent one another, a weight carried by one spring arm at its free end portion and adapted to be displaced with oscillatory motion of said one spring arm when the unit is mishandled, the weight having an insulated portion and a conductive portion, the latter constituting a first contact, and a second contact carried by the other spring arm at its free end portion, the second contact being frictionally maintained in circuit-closing engagement with the first contact by the mentioned other spring arm and adapted to be urged by the latter into position for engagement with the insulated portion of the weight upon displacement thereof.

References Cited in the file of this patent

UNITED STATES PATENTS

| | | |
|---|---|---|
| 1,078,410 | Bock | Nov. 11, 1913 |
| 2,943,308 | Westphal | June 28, 1960 |

FOREIGN PATENTS

| | | |
|---|---|---|
| 145,851 | Germany | Nov. 9, 1903 |
| 212,672 | Switzerland | Mar. 17, 1941 |
| 258,669 | Great Britain | Sept. 27, 1926 |
| 411,968 | Italy | Aug. 28, 1945 |